L. MITCHELL.
DOUGH DROPPER FOR FRYING DOUGHNUTS.
APPLICATION FILED JAN. 16, 1920.

1,345,500.

Patented July 6, 1920.
3 SHEETS—SHEET 3.

Inventor:
Leon Mitchell,
by Walter E. Lombard,
Atty.

UNITED STATES PATENT OFFICE.

LEON MITCHELL, OF DORCHESTER, MASSACHUSETTS.

DOUGH-DROPPER FOR FRYING DOUGHNUTS.

1,345,500.  Specification of Letters Patent.  Patented July 6, 1920.

Application filed January 16, 1920. Serial No. 353,359.

*To all whom it may concern:*

Be it known that I, LEON MITCHELL, a citizen of the United States of America, and a resident of Dorchester, in the county of Suffolk and Commonwealth of Massachusetts, have invented certain new and useful Improvements in Dough-Droppers for Frying Doughnuts, of which the following is a specification.

This invention relates to dough droppers and particularly to devices of this class, which are adapted to drop rings of dough to be used in making doughnuts.

The invention has for its object the provision of a portable device operable by a crank from which a continuous series of rings of dough may be deposited upon a suitable receptacle.

The invention consists in certain novel features of construction and arrangement of parts which will be readily understood by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Fig. 5 represents a vertical section of a portion of the hopper and feeding mechanisms on line 5, 5, on Fig. 2.

Similar characters indicate like parts throughout the several figures of the drawings.

Figure 1:
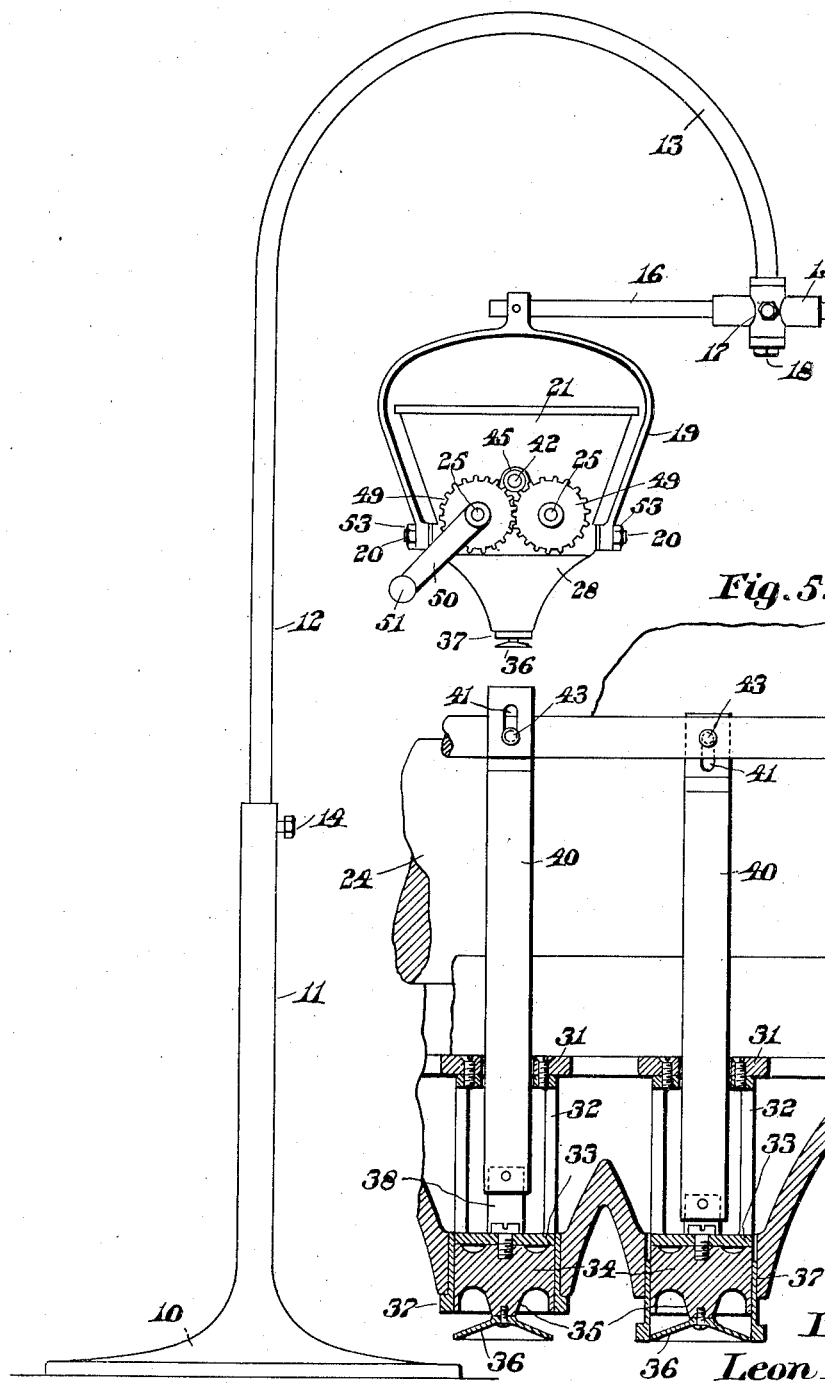
Figure 1 represents an elevation of a device embodying the principles of the present invention.

In the drawings, 10 is a weighted base having extending upwardly therefrom, a central tubular portion 11 in which is telescopically mounted a rod 12 having a curved lateral extension 13. The rod 12 may be adjusted vertically relatively to the base 11 and secured in adjusted position by means of the set screw 14.

The outer end of the curved extension 13 has pivotally mounted thereon, a sleeve 15 in which is adjustably mounted a horizontal rod 16.

The rod 16 may be adjusted endwise in the sleeve 15 and secured in adjusted position by means of the set screw 17.

The sleeve 15 is adapted to be locked in adjusted position about the axis of the outer end of the extension 13 by means of the clamping bolt 18.

The outer end of the rod 16 has mounted thereon a bail 19 the lower ends of which are pivotally connected at 20 to a casing 21.

Figure 2:
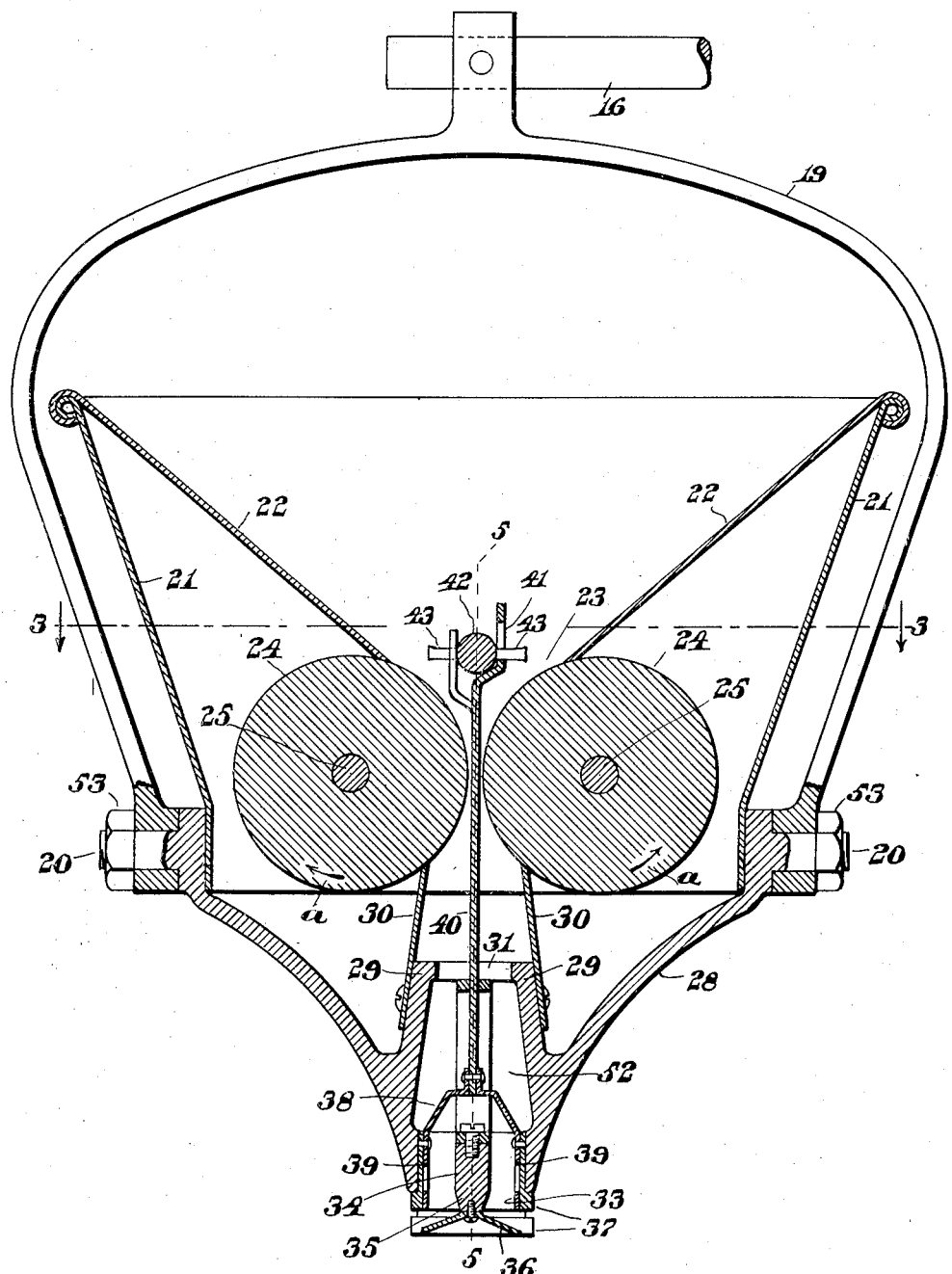
Fig. 2 represents a vertical section of the hopper and feeding devices, drawn to an enlarged scale.

This casing 21 is rectangular in plan and from the upper end of two opposite sides thereof plates 22 extend downwardly toward each other with their lower ends separated as indicated at 23 in Fig. 2 of the drawings.

These downwardly inclined plates 22 and the ends of the casing 21 form a hopper adapted to receive dough.

Beneath the lower ends of the downwardly inclined plates 22 are feed rollers 24 mounted upon and revoluble with shafts 25 extending through the casing 21 and having bearing in upwardly extending ears 26 formed on brackets 27 secured to the weighted lower end 28 of the casing 21.

This member 28 is provided with upwardly extending ribs 29 oppositely disposed an equal distance from the center of the member 28.

Secured to these ribs 29 are scraper plates 30 coacting with the peripheries of the feed rollers 24 to separate the dough therefrom and cause it to be deposited between the ribs 29 as the dough is fed downwardly from the hopper 22 by means of the rotation of the feed rolls in the direction of the arrows *a* in Fig. 2 of the drawings.

Between the upper ends of the ribs 29 are connecting bars 31 and depending from and secured to these bars 31 is a U-shaped bail 32 to the lower end of which is secured a cylindrical member 33 having a transverse rib 34.

This transverse rib 34 has a downwardly extending centrally disposed hub 35 to which is secured a circular cone-shaped disk 36.

Surrounding each cylindrical member 34 is a reciprocating pusher or separating member 37 to the upper end of which is secured a bail 38, the lower ends of which are adapted to reciprocate in vertical slots 39 in the cylindrical member 33.

The pusher 37 is annular and provided with a peripheral flange at its lower end adapted to coact with the lower end of the member 28 to limit the upward movement of said pusher.

The upper end of each bail 38 has connected thereto, a bar 40, the upper end of which is bent outwardly and upwardly and provided with an elongated vertical slot 41.

The upper slotted portion of one bar 40 is on one side of an oscillating rod 42 while the upper slotted portion of the other bar 40 is on the opposite side of said oscillating member 42.

This oscillating member 42 is provided with radial projections 43 each extending through a slot 41 in one of the bars 40.

The rod 42 extends through the casing 21 and has bearings in upwardly extending ears 44 projecting upwardly from the bracket 27.

One end of the rod 42 has a collar 45 secured thereto while the other end of said rod 42 has a lever 46 secured thereto.

The outer end of the lever 46 is connected by a link 47 with the outer end of a lever 48 secured to one of the shafts 25.

Figure 3:
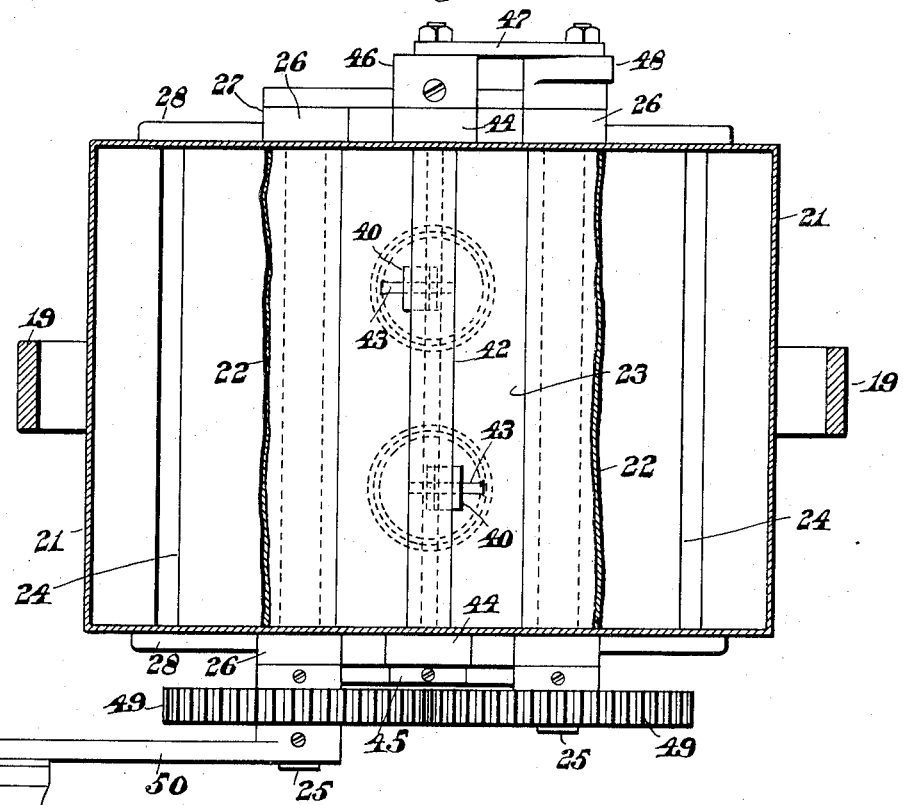
Fig. 3 represents a horizontal section on line 3, 3, on Fig. 2.
Figure 4:
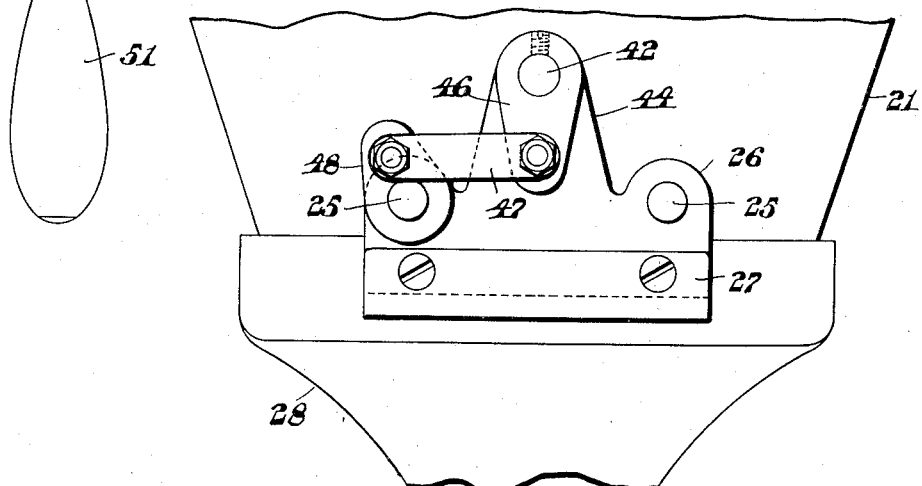
Fig. 4 represents an elevation of a detail of the mechanism for actuating the feeding devices.

Each shaft 25 has a gear 49 secured to the outside of the casing 21 and bracket 27, said gears 49 meshing with each other as indicated in Figs. 1 and 3.

One of the shafts 25 is provided with a radial crank arm 50 having a handle 51 secured thereto by which the feed rollers may be rotated to feed the dough from the hopper 22 downwardly into the compartments 52 formed by the ribs 29 in the lower part 28 of the casing 21.

As the dough is fed down by means of the rotation of the rollers 24, it will be forced into the compartment 52 and therefrom through the interior of the cylindrical members 33 until it strikes against the downwardly inclined circular disk 36 which causes the dough to be forced laterally in every direction.

When a given quantity of dough has been forced outwardly as before described, the pusher or separating member will move downwardly and cut off from the supply of dough an annular portion of dough suitable to form a doughnut.

The interior diameter of the pusher or separator 37 is the same as the diameter of the disk 36 so that in the downward movement of said pusher or separator, the disk 36 will be positioned within said pusher.

Owing to the disposition of the upper slotted ends of the bars 40 on opposite sides of the oscillating rod 42, it is obvious that one pusher will be moved downwardly while the other is being moved upwardly.

Owing to the lost movement of the projections 43 in the elongated slots 41, each pusher will remain in its lowermost position for a limited time before being lifted and will also remain in its uppermost position a predetermined time to permit a given quantity of dough to be forced outwardly from the disk 36 before the pusher or separator 34 moves downwardly to separate an annular portion of dough from the main supply.

While in the drawings only two discharge openings are shown in the lower portion 28 of the casing 21, it is obvious that a greater number of openings may be provided without affecting the invention.

The present device being portable, may be moved into any part of a bakery and adjusted to accommodate itself to various conditions therein.

When once positioned adjacent to the receiving pans to be used in frying the doughnuts, the operator by turning the crank 50, 51 may quickly eject from the hopper 22, sufficient rings of dough to cover the entire surface of the receiving pan.

The lower portion 28 being made of heavy material gives sufficient weight to more than counterbalance the weight of the dough inserted within the hopper 22.

As the dough diminishes in the hopper, the entire casing may be tilted about the axis of the trunnions 20 to permit a new supply of dough to be inserted within the hopper 22 or if desired, the nuts 53 may be adjusted to clamp the bail 19 to the member 28 so that it will be immovable relatively to said bail, the supply of dough then being inserted into the hopper from either end thereof.

It is self-evident that after the dough has been once deposited in the hopper 22 there is no opportunity for said dough to come subsequently in contact with the hands of the operators.

It is believed that the operation and its many advantages will be fully understood without further description.

Having thus described my invention, I claim—

1. In a device of the class described, a supported casing having an annular discharge opening in the bottom; an open bottomed dough-receiving hopper within the top thereof open at the bottom; feed rollers within said casing beneath said hopper and parallel with the opening in the bottom of said hopper adapted to eject dough through said discharge opening; means for deflecting the dough outwardly as it passes from said opening; and reciprocating means within said casing beneath said feed rollers whereby portions of said dough may be separated in annular form from the body of the dough ejected through said opening.

2. In a device of the class described, a casing having a walled compartment in the bottom thereof and a hopper at the top thereof adapted to receive dough and provided with an elongated slot in the bottom thereof, said compartment having an annular discharge opening in the bottom thereof; means for deflecting the dough outwardly as it passes from said opening; two feed rollers beneath said hopper parallel with the longer sides of said slot and on opposite sides thereof; means for rotating said feed rollers to force dough into said compartment and through said discharge opening; and reciprocating means in the bottom of said compartment whereby portions of said dough may be separated in annular form from the body of the dough ejected through said opening.

3. In a device of the class described, a casing having a walled compartment provided with an annular discharge opening in the bottom thereof and also having in the top thereof a hopper to receive dough provided with an elongated slot in the bottom thereof; revoluble feed rollers beneath said hopper and parallel to the longer sides of said slots for forcing dough into said compartment; and independent means surrounding said annular discharge opening for separating portions of the dough ejected through said annular discharge opening.

4. In a device of the class described, a casing having an annular discharge opening in the bottom thereof provided at the top thereof with a hopper to receive dough having an elongated opening in the bottom thereof; revoluble feed rollers beneath said hopper and parallel with the longer sides of said slot for forcing dough through said opening; and a positively driven cylindrical reciprocating member surrounding said annular opening for separating the dough ejected through said annular discharge opening.

5. In a device of the class described, a casing having an annular discharge opening in the bottom thereof and provided at the top thereof with an open bottomed hopper to receive dough; revoluble rollers for feeding the dough from said hopper and forcing it through said opening; a circular disk opposite said discharge opening and separated from the end of the wall thereof; a reciprocating cylindrical plunger surrounding said discharge opening coacting with said disk to separate from the dough within said casing rings of dough ejected from said discharge opening; and means within said casing for imparting reciprocatory movement to said plunger.

6. In a device of the class described, a casing having a walled compartment provided with an annular discharge opening in the bottom thereof; an open bottomed hopper to receive dough above said compartment; revoluble feed rollers beneath said hopper for forcing dough into said compartment and through said opening; scraper plates secured to the walls of said compartment and extending upwardly into contact with the peripheries of said rollers; a circular disk opposite said discharge opening and separated from the end of the wall thereof; and a positively driven reciprocating cylindrical plunger coacting with and adapted in its movement to surround the edge of said disk to separate from the dough within said casing rings of dough ejected from said discharge opening.

7. In a device of the class described, a casing having an annular discharge opening in the bottom thereof and provided at the top with an open bottomed dough-receiving hopper; revoluble feed rollers beneath said hopper for forcing dough through said opening; a circular cone-shaped disk opposite said discharge opening and separated from the end of the wall thereof; and a positively driven reciprocating cylindrical plunger surrounding said discharge opening coacting with said disk to separate from the dough within said casing rings of dough ejected from said discharge opening.

8. In a device of the class described, a casing having an annular discharge opening in the bottom thereof and provided at the top with an open bottomed dough-receiving hopper; revoluble feed rollers for forcing dough through said opening; a circular cone-shaped disk opposite said discharge opening and separated from the end of the wall thereof; a reciprocating cylindrical plunger coacting with said disk to separate from the dough in said hopper rings of dough ejected from said discharge opening; an oscillating shaft in said casing; and a connector between said shaft and plunger for imparting reciprocatory movement to the latter by the oscillation of the former.

9. In a device of the class described, a casing having in its lower end a compartment provided with a plurality of annular discharge openings in the bottom thereof and having in its upper end a hopper adapted to receive dough and provided with an open bottom; two feed rollers for forcing dough from said hopper into said compartment and through said openings; means for rotating said feed rollers; and means surrounding said annular discharge openings adapted to be positively reciprocated and separate rings of dough from the dough ejected through said openings.

10. In a device of the class described, a casing having a plurality of annular discharge openings in the bottom thereof and an open bottomed dough-receiving hopper at the top thereof; revoluble feed rollers for forcing dough through each opening; a circular cone-shaped disk opposite each discharge opening and separated from the end of the wall thereof; a reciprocating cylindrical plunger surrounding said discharge opening coacting with each disk to separate from the dough in said hopper rings of dough ejected from said discharge opening; and means for alternately reciprocating said plungers.

11. In a device of the class described, a casing having a plurality of annular discharge openings in the bottom thereof and an open bottomed dough-receiving hopper at the top thereof; revoluble feed rollers for forcing dough through said openings; a circular cone-shaped disk opposite each discharge opening and separated from the end of the wall thereof; a reciprocating cylindrical plunger coacting with each disk to separate from the dough in said hopper rings of dough ejected from said discharge openings; an oscillating shaft in said casing; and a connector between said shaft and each plunger for alternately imparting reciprocatory movement to said plungers.

12. In a device of the class described, a casing having an annular discharge opening in the bottom thereof and an open bottomed hopper to receive dough at the top thereof; revoluble feed rollers for forcing dough through said opening; an oscillating shaft; and a reciprocating plunger actuated by said shaft and surrounding said annular opening adapted to separate from the dough in the casing the dough ejected through said annular discharge opening.

13. In a device of the class described, a casing having an annular discharge opening in the bottom thereof and an open bottomed hopper to receive dough at the top thereof; revoluble feed rollers for forcing dough through said opening; a cylindrical reciprocating member surrounding said discharge opening; and means operable by the rotation of said feed rollers for imparting reciprocatory movement to said reciprocating member.

14. In a device of the class described, a casing having an annular discharge opening in the bottom thereof and an open bottomed hopper to receive dough at the top thereof; revoluble feed rollers for forcing dough through said opening; a circular disk opposite said discharge opening and separated from the end of the wall thereof; a reciprocating cylindrical plunger coacting with said disk to separate from the dough within said casing rings of dough ejected from said discharge opening; an oscillating shaft; a lateral stud thereon; and an actuating member for said plunger having at the upper end an elongated slot through which extends said stud.

15. In a device of the class described, a casing having two annular discharge openings in the bottom thereof and an open bottomed hopper to receive dough at the top thereof; revoluble feed rollers for forcing dough through said openings; a circular disk opposite each discharge opening and separated from the end of the wall thereof; a reciprocating cylindrical plunger coacting with and adapted in its movement to surround the edge of said disk to separate from the dough within said casing rings of dough ejected from said discharge opening; an oscillating shaft; lateral studs extending from opposite sides of said shaft; and a connector from each stud to one of said plungers.

Signed by me at 746–7 Old South Bldg., Boston, Mass., this 13th day of January, 1920.

LEON MITCHELL.

Witnesses:
 WALTER E. LOMBARD,
 NATHAN C. LOMBARD.